(12) United States Patent
Ichioka

(10) Patent No.: US 9,682,414 B2
(45) Date of Patent: Jun. 20, 2017

(54) PLATE MATERIAL CONVEYANCE APPARATUS WITH TEMPORARY PLACEMENT TABLE

(71) Applicant: MURATA MACHINERY, LTD., Kyoto-shi, Kyoto (JP)

(72) Inventor: Hirokazu Ichioka, Inuyama (JP)

(73) Assignee: MURATA MACHINERY, LTD., Kyoto (JM)

( * ) Notice: Subject to any disclaimer, the term of this patent is extended or adjusted under 35 U.S.C. 154(b) by 89 days.

(21) Appl. No.: 14/390,827

(22) PCT Filed: Mar. 21, 2013

(86) PCT No.: PCT/JP2013/058029
§ 371 (c)(1),
(2) Date: Oct. 6, 2014

(87) PCT Pub. No.: WO2013/157347
PCT Pub. Date: Oct. 24, 2013

(65) Prior Publication Data
US 2015/0165508 A1 Jun. 18, 2015

(30) Foreign Application Priority Data
Apr. 18, 2012 (JP) ................................. 2012-094508

(51) Int. Cl.
*B21D 43/00* (2006.01)
*B65H 5/04* (2006.01)
(Continued)

(52) U.S. Cl.
CPC ........... *B21D 43/003* (2013.01); *B21D 43/22* (2013.01); *B21D 43/24* (2013.01); *B25J 11/00* (2013.01);
(Continued)

(58) Field of Classification Search
CPC ........ B21D 43/003; B21D 43/22; B65H 5/16; B65H 5/04; B65H 5/222; B23Q 7/103
See application file for complete search history.

(56) References Cited

U.S. PATENT DOCUMENTS 6,179,549 B1 * 1/2001 Hayakawa ............. B21D 28/12
414/222.11
6,413,035 B1 * 7/2002 Kaneko .............. B23K 26/0838
414/222.07
(Continued)

FOREIGN PATENT DOCUMENTS

JP         05-213482 A         8/1993
JP         05213482 A    *    8/1993
(Continued)

OTHER PUBLICATIONS

English translation of Official Communication issued in corresponding International Application PCT/JP2013/058029, mailed on Dec. 11, 2014.

(Continued)

Primary Examiner — Gerald McClain
(74) Attorney, Agent, or Firm — Keating & Bennett, LLP

(57) ABSTRACT

A plate material conveyance apparatus, disposed next to a plate processing machine, includes an unprocessed plate material placement unit, a processed plate material placement unit, a loader, an unloader and a temporary placement table. The loader reciprocally moves between the unprocessed plate material placement unit and the plate processing machine to deliver an unprocessed plate material onto the plate processing machine. The unloader reciprocally moves in parallel to and below the loader between the unprocessed plate material placement unit and the plate processing machine, and delivers a processed plate material from the plate processing machine to the temporary placement table positioned above the unprocessed plate material placement unit. The temporary placement table slides between the unprocessed plate material placement unit and the plate processing machine, and transfers the processed plate mate-
(Continued)

rial, received from the unloader, to the processed plate material placement unit.

5 Claims, 12 Drawing Sheets

(51) Int. Cl.
 *B65H 5/16* (2006.01)
 *B65H 5/22* (2006.01)
 *B21D 43/24* (2006.01)
 *B25J 11/00* (2006.01)
 *B21D 43/22* (2006.01)
 *B21D 43/13* (2006.01)
 *B23Q 7/04* (2006.01)
 *B23Q 7/10* (2006.01)

(52) U.S. Cl.
 CPC ............... *B21D 43/13* (2013.01); *B23Q 7/04* (2013.01); *B23Q 7/103* (2013.01); *B65H 5/04* (2013.01); *B65H 5/16* (2013.01); *B65H 5/222* (2013.01)

(56) References Cited

U.S. PATENT DOCUMENTS 7,329,083 B2 *   2/2008  Nakazato ............... B65G 65/00
                                                  414/416.01
2004/0240980 A1 * 12/2004  Nakazato ............... B65G 65/00
                                                  414/788.7

FOREIGN PATENT DOCUMENTS

| JP | 2001-225128 A |   | 8/2001 |
| JP | 2001225128 A | * | 8/2001 |
| JP | 2004-237334 A |   | 8/2004 |
| JP | 2007-326106 A |   | 12/2007 |

OTHER PUBLICATIONS

Official Communication issued in International Patent Application No. PCT/JP2013/058029, mailed on Jun. 18, 2013.

* cited by examiner

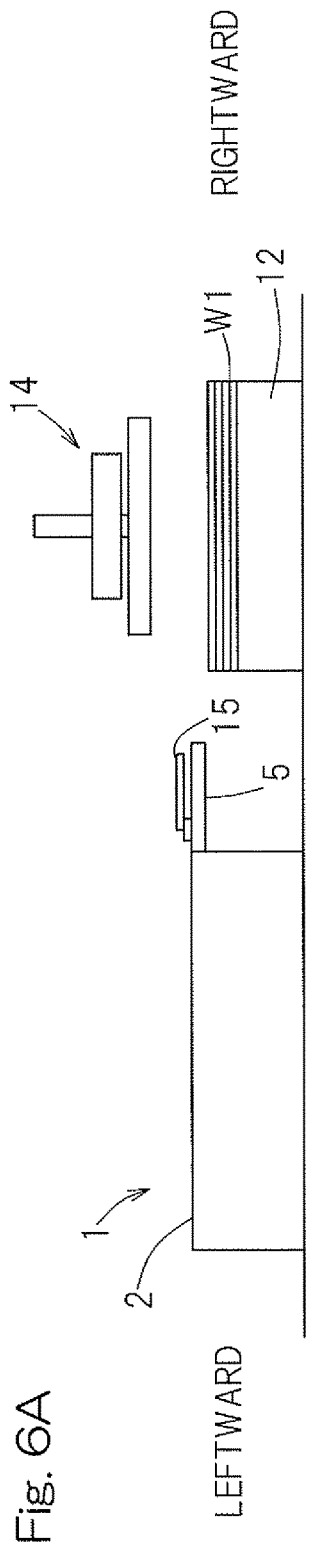
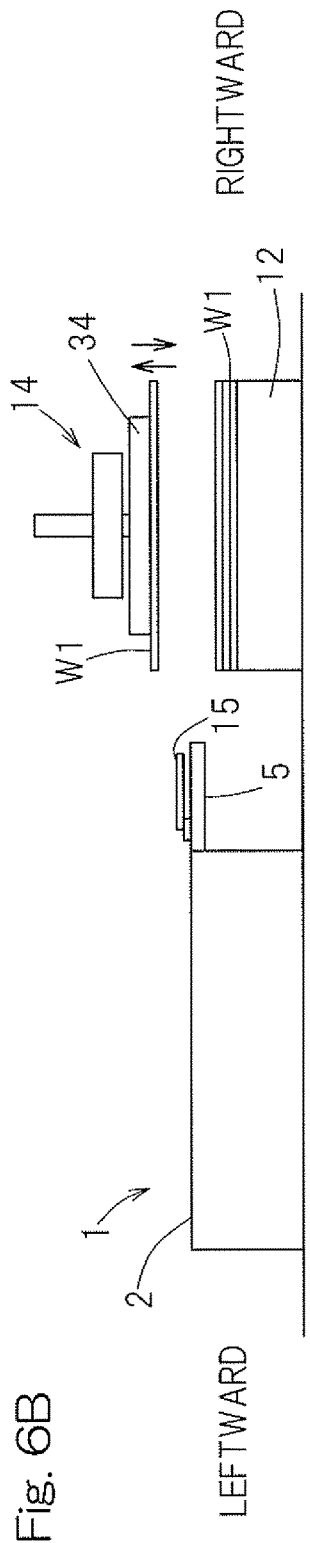
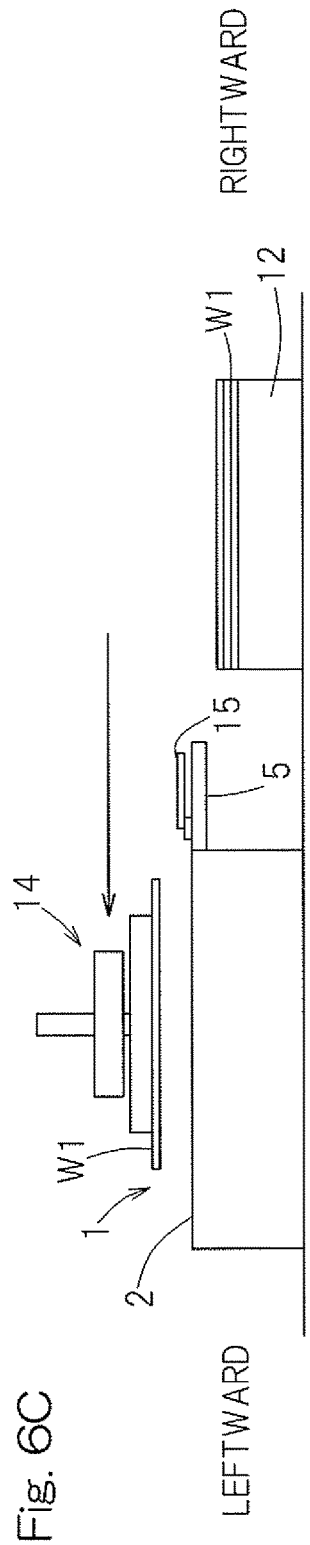

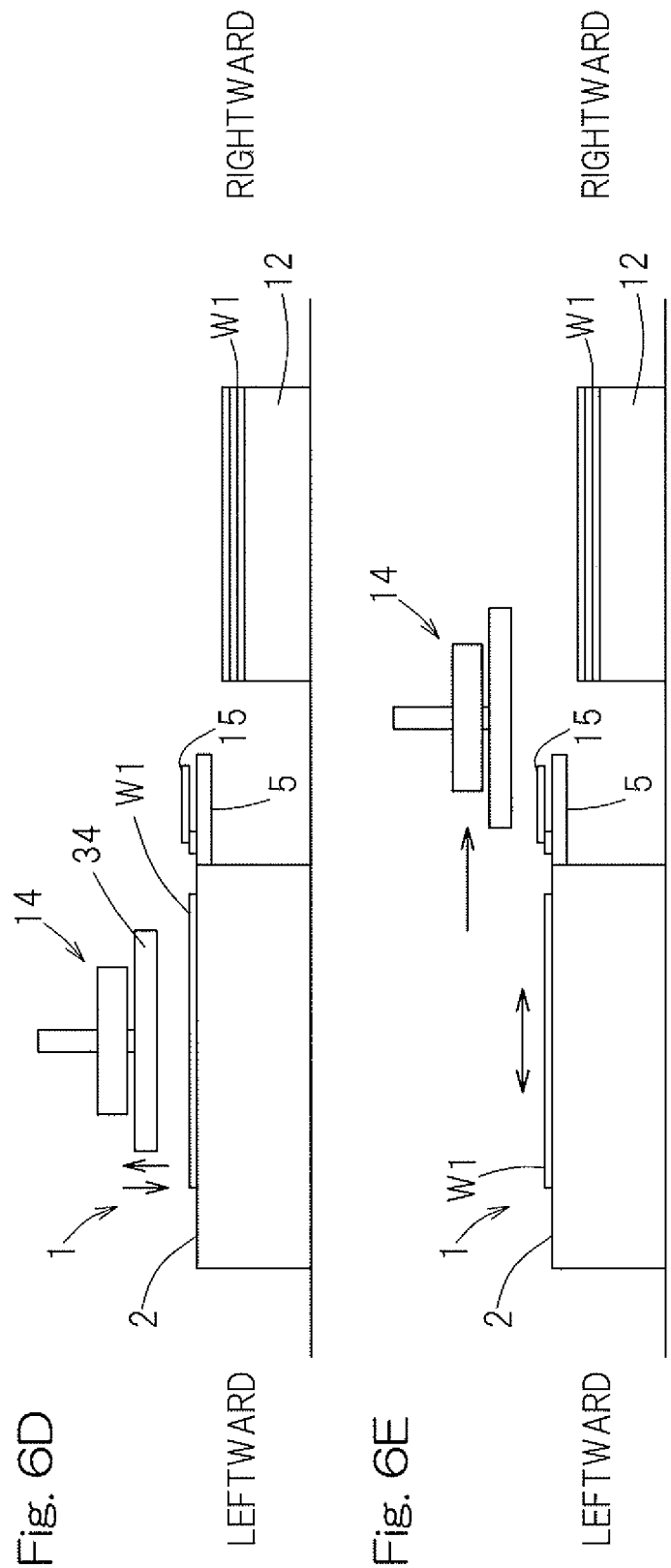

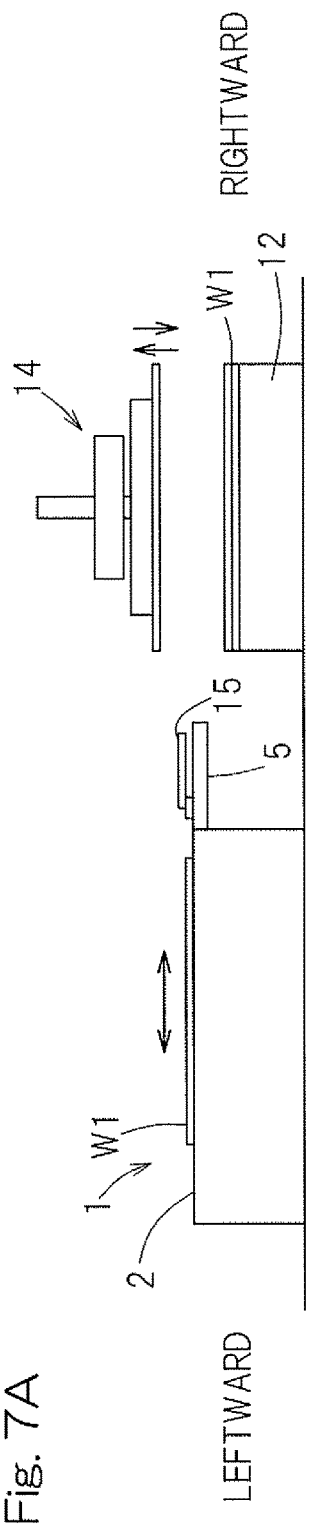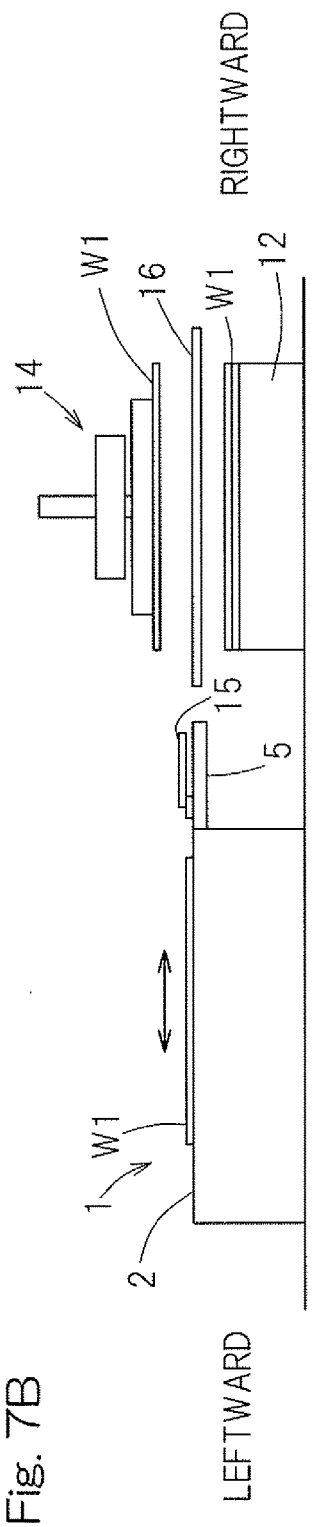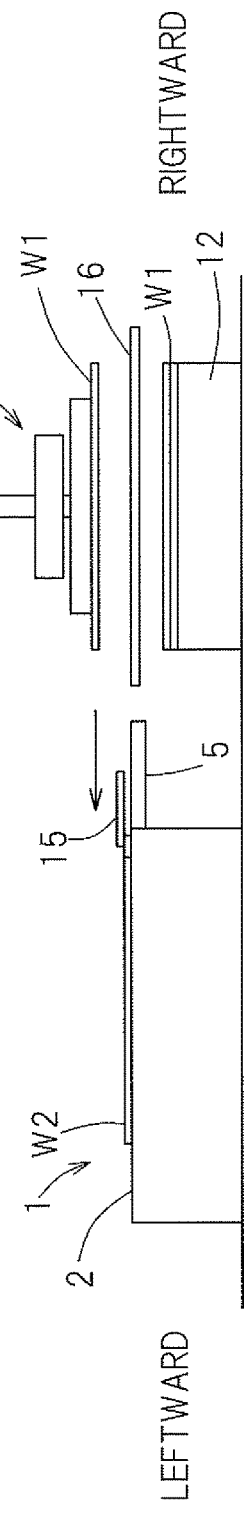

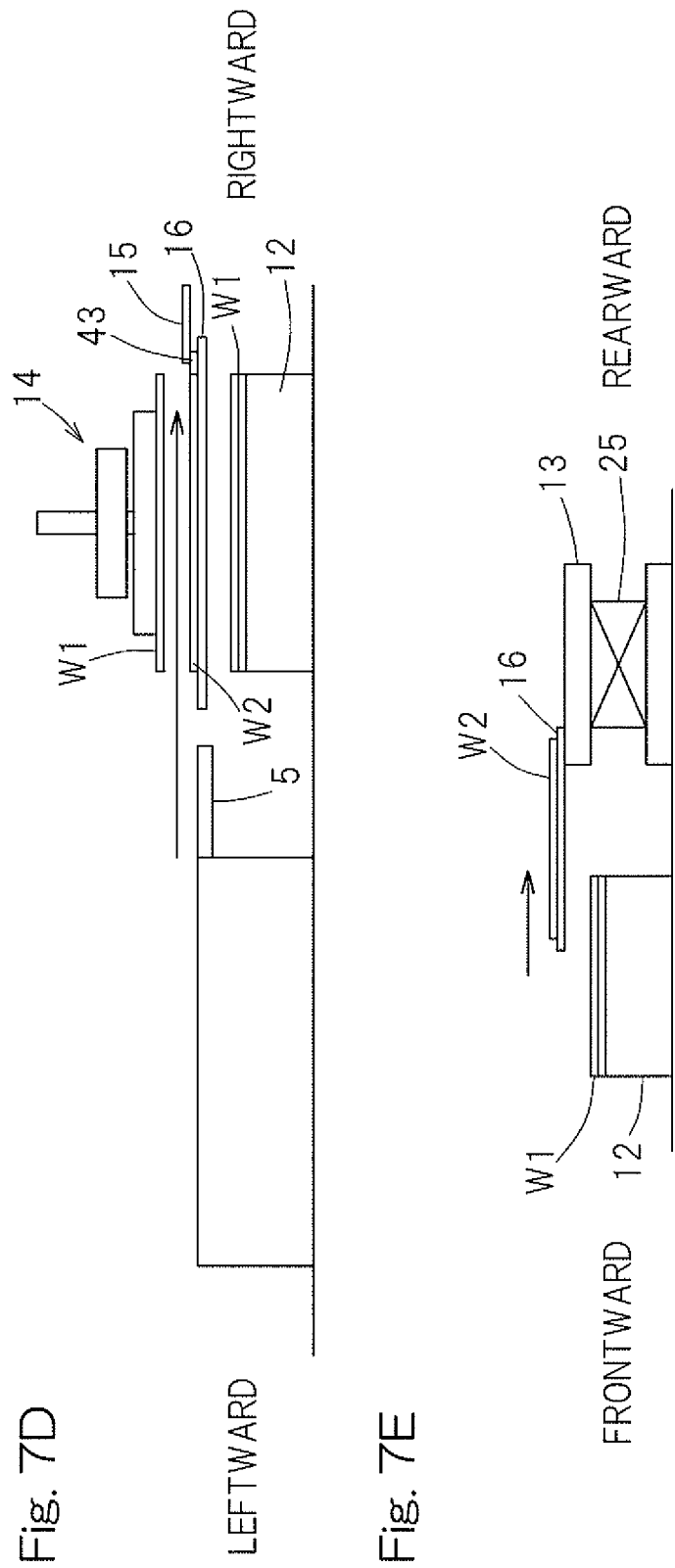

PLATE MATERIAL CONVEYANCE APPARATUS WITH TEMPORARY PLACEMENT TABLE

CROSS REFERENCE TO THE RELATED APPLICATION

This application is based on and claims Convention priority to Japanese patent application No. 2012-094508, filed Apr. 18, 2012, the entire disclosure of which is herein incorporated by reference as a part of this application.

BACKGROUND OF THE INVENTION

1. Field of the Invention

The present invention relates to a plate conveyance apparatus and a plate processing system using such plate conveyance apparatus, which are capable of loading an unprocessed plate material or sheet metal onto a plate processing machine and unloading a processed plate material from such plate processing machine.

2. Description of the Related Art

The plate material conveyance apparatus capable of loading unprocessed plate materials onto a plate processing machine such as, for example, a punch press and unloading the processed plate material from the plate processing machine is currently available in two types. One of the two types makes use of a single plate material conveyance unit which is capable of performing both of the loading of the unprocessed plate material and the unloading of the processed plate material such as disclosed in, for example, JP Laid-open Patent Publication No. 2007-326106, and the other of the two types makes use of a plate material loading unit (loader) dedicated solely for the loading and a processed plate material unloading unit (unloader) dedicated solely for the unloading such as disclosed in, for example, JP Laid-open Patent Publication No. H05-213482 and JP Laid-open Patent Publication No. 2004-237334. The latter has a higher plate material loading and unloading efficiency than that of the former since not only can the unloader undergo a loading setup of the unprocessed plate material while the loader performs a loading operation to load the unprocessed plate material, but also the loader can undergo a loading setup of the unprocessed plate material while the unloader undergoes an unloading operation.

Also, even though both types make use of the loader and the unloader, JP Laid-open Patent Publication No. H05-213482 discloses the structure in which the loader and the unloader travel along the same path, but JP Laid-open Patent Publication No. 2004-237334 discloses the structure in which the loader and the unloader travel along different paths. Where the loader and the unloader are configured so as to travel along the respective paths that are different from each other, the loader and the unloader do little to interfere in operation with each other, it is possible to minimize the loading standby time and the unloading standby time and, therefore, the efficiency of loading and unloading the plate material is further increased.

Also, since according to JP Laid-open Patent Publication No. 2004-237334 the path of travel of the loader and that of the unloader are disposed one above the other in a vertical direction, such an advantage can be appreciated that there is no need to secure a large space for installation of the loader and the unloader in a horizontal plane.

Plate materials to be supplied onto the plate processing machine are placed in a stacked fashion in an unprocessed plate material placement unit defined in the vicinity of the plate processing machine and, processed plate materials which have been successively processed by the plate processing machine are placed in a similarly stacked fashion in a processed plate material placement unit defined at a location different from the unprocessed plate material placement unit. Accordingly, in the plate material conveyance apparatus in which the path of travel of the loader and that of the unloader are disposed respectively at different vertical positions, there is a recognized need for a means for conveying horizontally the unprocessed plate material or the processed plate material between the unprocessed plate material placement unit and the processed plate material placement unit separate from the use of the loader and the unloader. For example, in the case where the unprocessed plate material placement unit is disposed immediately below the respective paths of travel of the loader and the unloader, the processed plate material after having been conveyed by the unloader is horizontally conveyed to the processed plate material placement unit that is disposed at a location distant from the path of travel referred to above.

In the case of the plate material conveyance apparatus disclosed in JP Laid-open Patent Publication No. 2004-237334, the horizontal conveyance of the plate material may be contemplated to implement with the use of a carriage. However, since the carriage is moved while a number of the processed plate materials are stacked on such carriage, the weight is high. Therefore, if such carriage is moved at a high speed, the stack of the processed plate materials on the carriage may be likely to become unstuck. For this reason, it is difficult for the carriage to be moved at such a high speed and, hence, a problem tends to arise that the cycle time in plate material loading and unloading may be extended correspondingly. Also, to move the carriage that is high in weight, a bulky driving source is required, resulting in the increase of electric power consumption.

SUMMARY OF THE INVENTION

In view of the foregoing, preferred embodiments of the present invention provide a plate material conveyance apparatus and a plate processing system, both of which have a reduced cycle time in plate material loading and unloading relative to the plate processing machine and require a relatively small space for installation.

A plate material conveyance apparatus in accordance with a preferred embodiment of the present invention is disposed next to a plate processing machine, and the apparatus includes an unprocessed plate material placement unit, a processed plate material placement unit disposed at a position different from that of the unprocessed plate material placement unit, a temporary placement table slidable between the unprocessed plate material placement unit and the processed plate material placement unit and configured to have a position switching capability to switch to an upper position of each of the placement units, a loader reciprocally movable between the unprocessed plate material placement unit and the plate processing machine and operable to load an unprocessed plate material onto the plate processing machine, and an unloader reciprocally movable between the unprocessed plate material placement unit and the plate processing machine at a location below a region of travel of the loader and in parallel or substantially in parallel to the loader, the unloader being operable to unload a processed plate material from the plate processing machine onto the temporary placement table then assuming a position above the unprocessed plate material placement unit. The temporary placement table referred to above is operable to transfer the processed plate material, which has been received from the unloader at an upper position of the unprocessed plate material placement unit, onto the processed plate material placement unit.

According to a preferred embodiment of the present invention, for example, loading and unloading of the plate materials relative to the plate processing machine are performed in the following manner. Namely, in a condition in which the unloader is held at a standby position defined near the plate processing machine, the loader picks up one of the unprocessed plate materials stacked on the unprocessed plate material placement unit and then transports it to the plate processing machine. The plate processing machine performs the processing on the unprocessed plate material then transported. During the processing being carried out by the plate processing machine, the loader returns to the unprocessed plate material placement unit and then performs an operation to pick up the next succeeding one of the unprocessed plate material.

Upon completion of the processing by the plate processing machine, the unloader then held at the standby position moves to the plate processing machine. Subsequently, the unloader receives the processed plate material from the plate processing machine and then transports such processed plate material to a position above the unprocessed plate material placement unit. The temporary placement table is positioned at the upper position of the unprocessed plate material placement unit and, hence, the processed plate material transported by the unloader is placed on the temporary placement table.

The temporary placement table having the processed plate material placed thereon slides to the processed plate material placement unit and then delivers the processed plate material onto the processed plate material placement unit. Thereafter, the temporary placement table returns to the upper position of the unprocessed plate material placement unit. During the reciprocal movement of the temporary placement table between the unprocessed plate material placement unit and the processed plate material placement unit, the unloader moves from the upper position of the unprocessed plate material placement unit to the standby position and, on the other hand, the loader starts the delivery of the unprocessed plate material onto the plate processing machine.

Hereinafter, with the loader, the unloader and the temporary placement table repeating respective operations similar to those described above, the unprocessed plate materials on the unprocessed plate material placement unit are delivered one by one onto the plate processing machine, and the processed plate material processed by the plate processing machine is unloaded onto the processed plate material placement unit.

As hereinabove described, during the plate processing machine performing the processing, the loader undergoes a loading preparation to deliver the unprocessed plate material and, on the other hand, the unloader performs an unloading preparation to transfer the processed plate material. Therefore, the wait time of the plate processing machine incident to the loading and unloading of the plate materials is significantly reduced or minimized. Also, since the region of travel of the loader and that of the unloader are different from each other, the operation of the loader and the operation of the unloader in no way interfere with each other. Therefore, the wait times of the loader and the unloader are significantly reduced or minimized. In view of the foregoing, the cycle time of plate material loading and unloading relative to the plate processing machine is significantly reduced. In addition, since the respective regions of travel of the loader and the unloader are arranged one above the other relative to each other, there is no need to secure respective large spaces of installation of the loader and the unloader on a horizontal plane.

Also, according to a preferred embodiment of the present invention, the processed plate material received from the unloader at the upper position of the unprocessed plate material placement unit is transported to the processed plate material placement unit by the temporary placement table. Since the temporary placement table is operable to pedestal the single processed plate material, it is light in weight as compared with a carriage on which a large number of processed plate materials are stacked. Also, since it is in a condition preceding the processed plate materials being stacked on the carriage, there is no problem associated with a displacement of the plate material on the temporary placement table. For this reason, the temporary placement table is configured to quickly slide between the unprocessed plate material placement unit and the processed plate material placement unit and, correspondingly, the cycle time of plate material loading and unloading is significantly reduced. Yet, when the temporary placement table is slid, a compact drive source is sufficient and therefore, the electric power consumption is significantly reduced or minimized.

In a preferred embodiment of the present invention, the plate material conveyance apparatus referred to above may further include a motion constraining member configured to constrain the processed plate material, which has been transported to the processed plate material placement unit while having been mounted on the temporary placement table, from moving in a direction where the unprocessed plate material placement unit exists. In this case, as the temporary placement table returns to the unprocessed plate material placement unit in a condition with the movement of the processed plate material constrained by the motion constraining member, the processed plate material is permitted to be mounted on the processed plate material placement unit.

The motion constraining member referred to above merely constrains the processed plate material from moving in the direction where the unprocessed plate material placement unit exists, and, therefore, it need not perform any complicated operation. For this reason, a mechanism configured to transfer the processed plate material on the temporary placement table onto the processed plate material placement unit is greatly simplified.

A plate processing system in accordance with a preferred embodiment of the present invention includes a plate processing machine and the above mentioned plate material conveyance apparatus disposed next to the plate processing machine.

According to a plate processing system of a preferred embodiment of the present invention, the plate material conveyance apparatus operates as described above with the loading of the unprocessed plate material and the unloading of the processed plate material taking place relative to the plate processing machine. Accordingly, similarly as described above, the cycle time of plate material loading and unloading relative to the plate processing machine is significantly reduced and the processing efficiency is good. Also, there is no need to secure the large spaces for installation of the loader and the unloader in the horizontal place. In addition, when the temporary placement table is slid, a compact drive source is sufficient and the electric power consumption is significantly reduced.

In the plate processing system referred to above, the plate processing machine may include a processing table, on which a plate material to be processed is placed, and a processing head is disposed rearwardly of the processing table. The processing table used in the plate processing system referred to above may include a first portion, where the unprocessed plate material delivered by the loader is placed, and a second portion from which the processed plate material is unloaded by the unloader, the first and second portions being commonized.

Since the region of travel of the loader of the plate material conveyance apparatus and the region of travel of the unloader of the plate material conveyance apparatus are disposed one above the other, the first portion of the processing table, where the unprocessed plate material is mounted, and the second portion, where the processed plate material is unloaded, are commonized. Therefore, the dimension of the processing table in a horizontal direction perpendicular or substantially perpendicular to the direction of conveyance of the loader and the unloader is significantly reduced.

Also, in the plate processing system according to a preferred embodiment of the present invention referred to above, the processed plate material placement unit may be disposed rearwardly of the unprocessed plate material placement unit and laterally of the processing head of the plate processing machine.

In this case, the plate processing machine and the plate material conveyance apparatus are snugly and neatly accommodated within a rectangular or substantially rectangular space, for example.

Any combination of at least two constructions or configurations, disclosed in the appended claims and/or the specification and/or the accompanying drawings should be construed as included within the scope of the present invention. In particular, any combination of two or more of the appended claims should be equally construed as included within the scope of the present invention.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 6A-6E are explanatory diagrams showing a first portion of the operation of the plate processing system.

FIGS. 7A-7E are explanatory diagrams showing a second portion of the operation of the plate processing system.

DETAILED DESCRIPTION OF THE PREFERRED EMBODIMENTS

Figure 1:
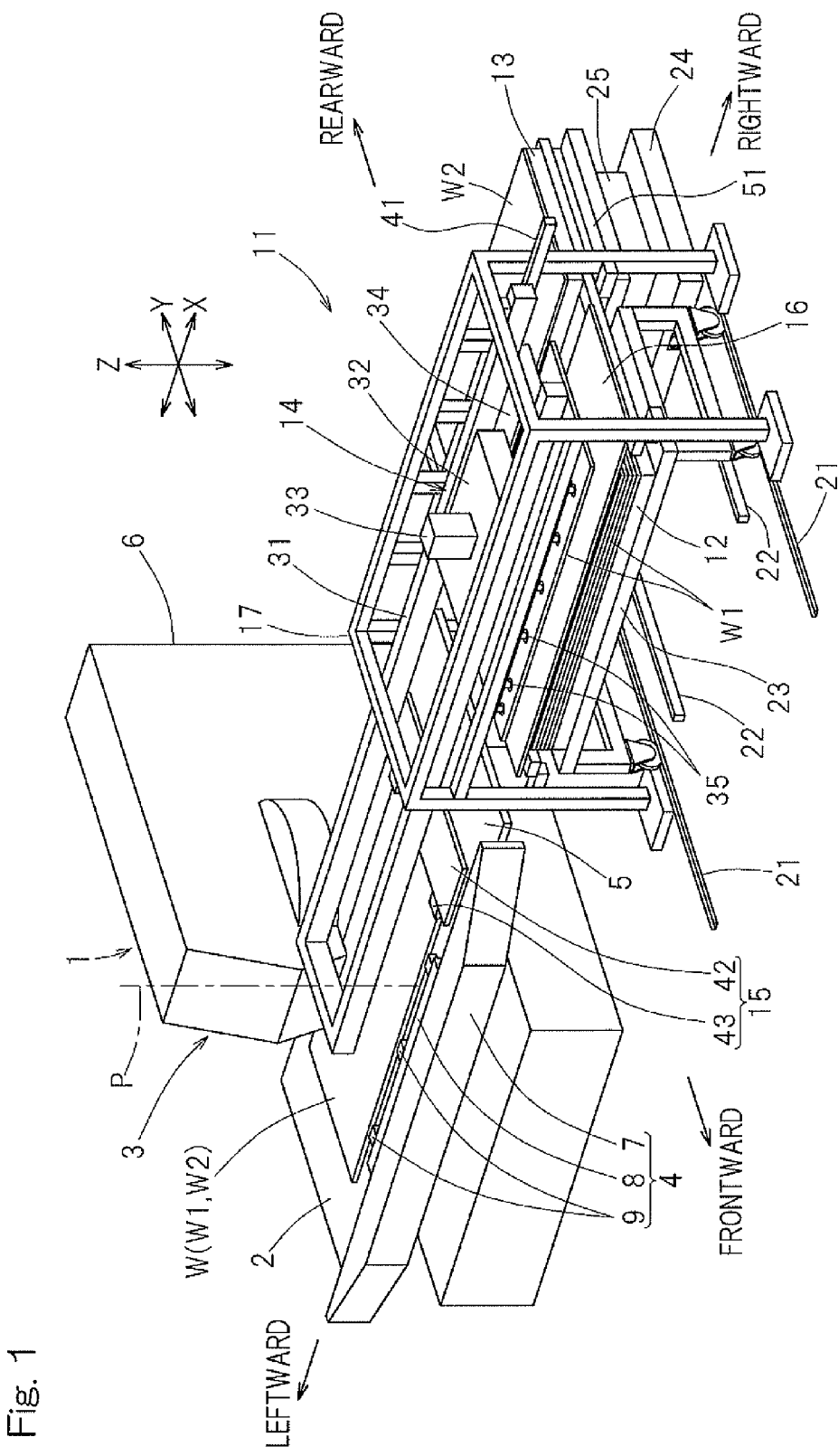
FIG. 1 is a perspective view showing a plate processing system in accordance with a preferred embodiment of the present invention.

Preferred embodiments of the present invention will be described with reference to the accompanying drawings. In particular, FIG. 1 illustrates a perspective view of a plate processing system designed in accordance with a preferred embodiment of the present invention. The illustrated plate processing system includes a plate processing machine 1 and a plate material conveyance apparatus 11 disposed rightwardly next to the plate processing machine 1 as viewed from the front.

The plate processing machine 1 is, in this instance, preferably used in the form of a turret punch press and includes a processing table 2 on which a sheet metal or a plate material W to be processed is placed, a processing head 3 configured to process the plate material W placed on the processing table 2, and a plate material transport device 4 configured to transport the plate material W on and along the processing table 2. On one side of the processing table 2 adjacent the plate material conveyance apparatus 11, a plate material guide table 5 protruding outwardly from the processing table so as to neighbor the plate material conveyance apparatus 11 is disposed. The processing table 2 and the plate material guide table 5 are associated with each other so as to support the plate material W from below by a plurality of brushes (not shown) fitted to an upper surface thereof.

The processing head 3 includes a pair of upper and lower turrets (not shown) configured to have a rotary indexing capability, and a plurality of punch tools (not shown) and a plurality of die tools (not shown) are mounted on an outer peripheral portion of each of those turrets so as to deploy in a direction circumferentially thereof. In a condition in which the punch tool and the die tool are indexed to a predetermined punching position P, the punch tool is driven by a punch drive mechanism (not shown) to strike the punch tool to perform a predetermined processing on the plate material W. For example, the processing is implemented, in which a major portion along an outer peripheral edge of a plurality of component plates (not shown) is blanked off in the plate material W, while leaving a small portion of the outer peripheral edge not blanked to render each of the component plates and a skeleton to be connected together.

The plate material transport device 4 includes a carriage 7, which is disposed for movement in a forward and rearward direction (Y-axis direction) relative to a frame 6, a cross slide 8 mounted on the carriage 7 so as to be movable in a leftward and rightward direction (X-axis direction) that is perpendicular or substantially perpendicular to the direction of movement of the carriage 7, and a plurality of work holders 9 configured to hold a front edge portion of the plate material W, which holders 9 are fitted to the cross slide 8.

Figure 2:
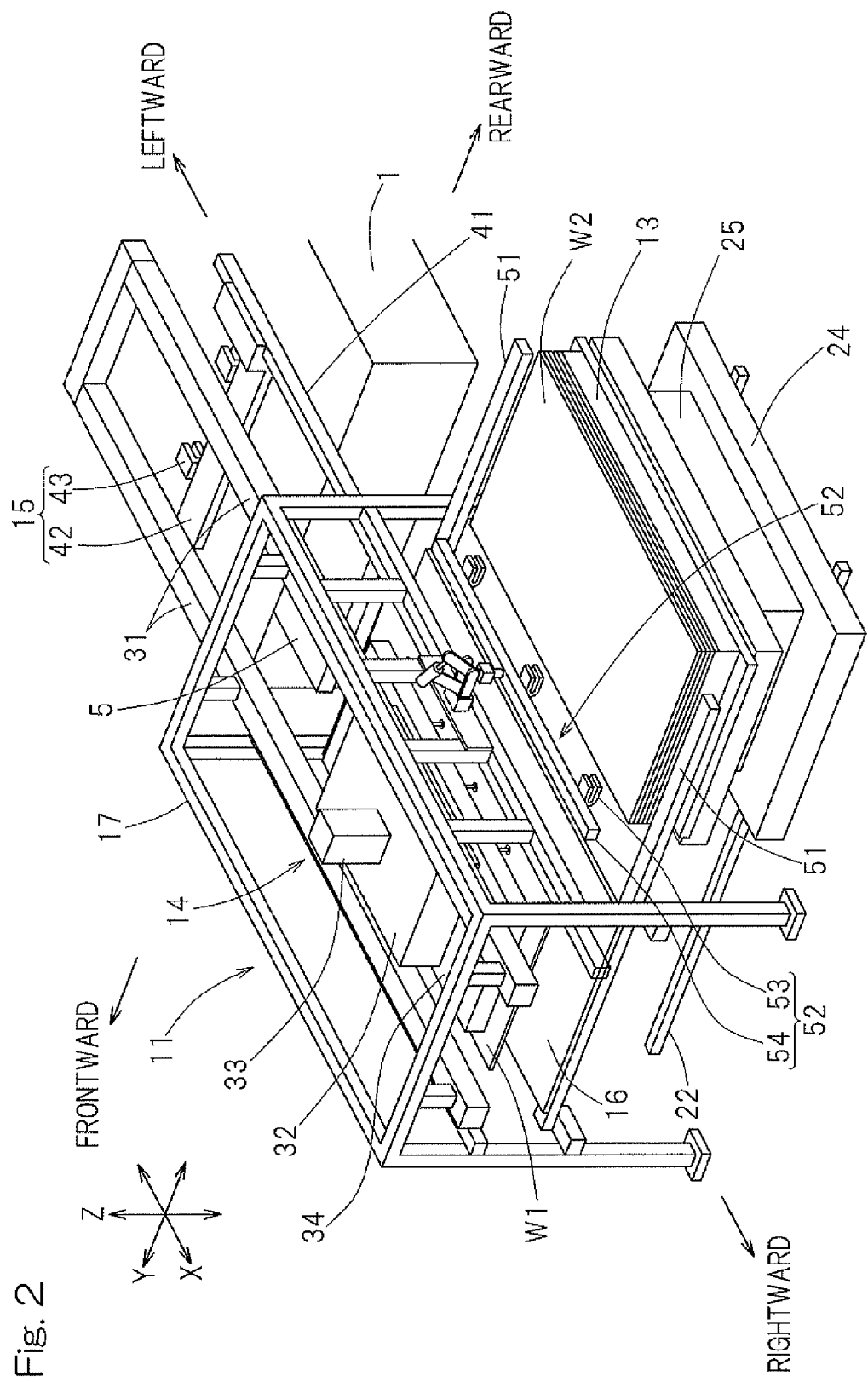
FIG. 2 is a perspective view showing a plate material conveyance apparatus, used in the plate processing system shown in FIG. 1, as viewed from an angle different from the angle of view of FIG. 1.
Figure 3:
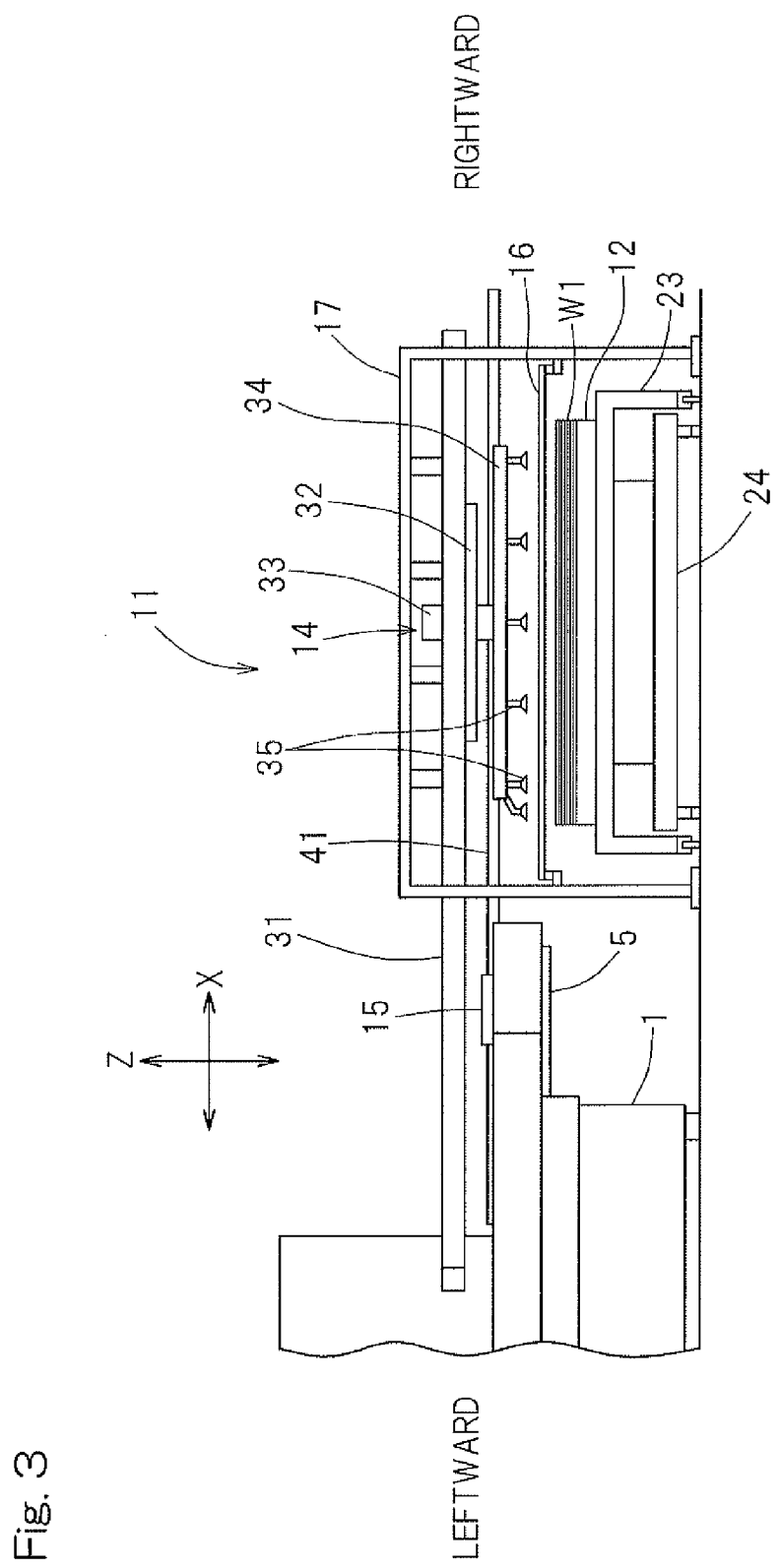
FIG. 3 is a schematic front elevational view of the plate material conveyance apparatus shown in FIG. 2.
Figure 4:
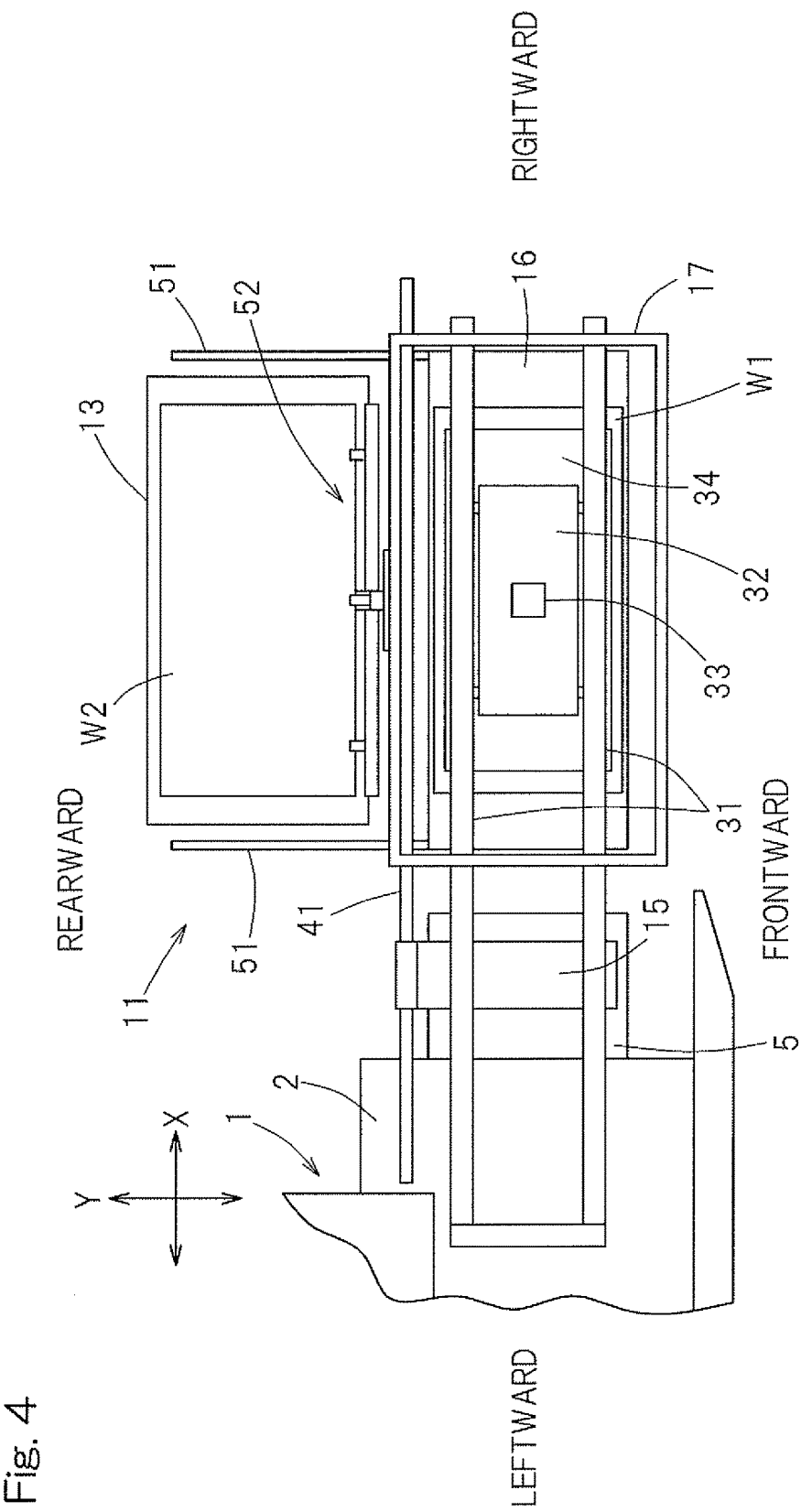
FIG. 4 is a schematic top plan view of the plate material conveyance apparatus shown in FIG. 2.

FIGS. 2 to 4 show the plate material conveyance apparatus 11. FIG. 2 illustrates a perspective view showing the plate material conveyance apparatus 11 as viewed in a direction different from the view shown in FIG. 1. FIGS. 3 and 4 illustrate front elevational and top plan views of the plate material conveyance apparatus 11. The plate material conveyance apparatus 11 includes an unprocessed plate material placement unit 12 on which the unprocessed plate materials W1 are placed, a processed plate material placement unit 13 on which the processed plate materials W2 are placed, a loader 14 configured to deliver the unprocessed plate materials W1 on the unprocessed plate material placement unit 12 one by one onto the plate processing machine 1, an unloader 15 configured to unload the processed plate material W2 from the plate processing machine 1, and a temporary placement table 16 configured to receive the processed plate material W2, which has been unloaded to a location above the unprocessed plate material placement unit 12, and then transporting it to the processed plate material placement unit 13. It is to be noted that in FIG. 2, a carriage 23, in which the unprocessed plate material placement unit 12 is installed, as will be described in detail later, is not shown for the sake of brevity.

The loader 14, the unloader 15 and the temporary placement table 16 are assembled on a stereoscopically assembled frame 17. The unprocessed plate material placement unit 12 and the processed plate material placement unit 13 in the illustrated preferred embodiment preferably include respective carriages 23 and 24 each movable along a corresponding pair of left and right rails 21 or 22 that are installed on a floor so as to extend in the forward and rearward direction. During the operation, the unprocessed plate material placement unit 12 is positioned at a right lower area of a space enclosed by the frame 17 and, on the other hand, the processed plate material placement unit 13 is positioned rearwardly of the unprocessed plate material placement unit 12 and out of the frame 17. It is to be noted that the wording "the processed plate material placement unit disposed at a position different from the unprocessed plate material placement unit", or any other wording to such effect, is intended to speak of a positional relationship in a condition assumed during the operation. The carriage 24 provided with the processed plate material placement unit 13 includes a lifting device 25 configured to lift the processed plate material placement unit 13. It is, however, to be noted that the unprocessed plate material placement unit 12 and the processed plate material placement unit 13 may not be provided with the respective carriages 23 and 24 and may be installed at associated fixed positions.

The loader 14 includes a traveling body 32 configured to travel along a pair of forward and rearward rails 31 provided on top of the frame 17 so as to extend in the leftward and rightward direction, a lifting rod 33 configured to move between ascended and descended positions relative to the traveling body 32, and a plate material holding body 34 provided at a lower end of the lifting rod 33. The traveling body 32 travels between an upper position of the unprocessed plate material placement unit 12 and an upper position of the processing table 2. The plate material holding body 34, for example, sucks and holds the processed plate material W1 by the use of a plurality of suction pads 35, arranged in forward and rearward, leftward and rightward directions. Each of those suction pads 35 are fluid connected with a source of negative pressure (not shown) through a tubing system.

The loader is configured to have, besides a function of holding the processed plate material W1 via the plate material holding body 34, a function of separating only the uppermost unprocessed plate material W1 from the stack of the unprocessed plate materials W1 then placed on the unprocessed plate material placement unit 12. By way of example, when one end of the plate material holding body 34 is slightly lifted upwardly while such unprocessed plate material W1 is sucked only by some of the suction pads 35 then disposed in an edgewise row of those suction pads 35, the uppermost unprocessed plate material W1 is flexed to allow a gap to be formed between it and the next adjacent unprocessed plate material W1 so that the uppermost unprocessed plate material W1 is subsequently separated from the remaining unprocessed plate materials W1 in the stack.

It is, however, to be noted that separation of the upper unprocessed plate material may not be necessarily limited to that described above, but any of various methods can be used. For example, a method can be used in which the upper unprocessed plate material is separated by applying magnetic forces of identical polarity to the uppermost unprocessed plate material W1 and the next adjacent unprocessed plate material W1 immediately below such uppermost unprocessed plate material W1, or a method can be suitably used in which air is blown in between the uppermost unprocessed plate material W1 and the next adjacent unprocessed plate material W1 immediately below such uppermost unprocessed plate material W1 to separate them from each other. In either case, a member configured to apply the magnetic forces or a member configured to flow the air may be installed on the side of the unprocessed plate material placement unit 12.

The unloader 15 referred to above includes a traveling body 42 capable of traveling along a rail 41 provided in the frame 17 so as to extend in the leftward and rightward direction and a plurality of grippers 43 capable of holding a right side edge portion of the processed plate material W2, which grippers 43 are fitted to the traveling body 42. The grippers 43, when sandwiching the processed plate material W2 between upper and lower jaws that are configured to be selectively opened and closed, holds the processed plate material W2. The rail 41 for the unloader 15 is disposed below the rails 31 for the loader 14, and the region of travel of the traveling body 42 of the unloader 15 is positioned beneath the region of travel of the traveling body 32 of the loader 14. In a manner similar to the traveling body 32 of the loader 14, the traveling body 42 of the unloader 15 moves the upper position of the unprocessed plate material placement unit 12 and the upper position of the processing table 2. It is to be noted that the region of travel of the traveling body 42 of the unloader 15, in this specification, indicates a region in which the processed plate material W2, then held by the grippers 43, and the unloader 15 move.

The temporary placement table 16 referred to previously has a thin plate shape having a leftward and rightward width, which is greater than that of the processed plate material W2, and, also, an upward and downward thickness that is smaller than that of the processed plate material W2. The temporary placement table 16 includes a plurality of brushes 16a (best shown in FIG. 5A) fitted to an upper surface thereof to support the processed plate material W2 from below. This temporary placement table 16 is slidably supported by a pair of left and right rails 51 having left and right opposite end portions thereof secured to the frame 17 so as to extend in the forward and rearward direction. The temporary placement table 16 moves along those rails 51 between the upper position of the unprocessed plate material placement unit 12 and the upper position of the processed plate material placement unit 13.

The frame 17 has its rear surface portion (back surface portion) provided with a transfer mechanism 52 configured to transfer the processed plate material W2 from the temporary placement table 16 onto the processed plate material placement unit 13. As shown in FIGS. 5A-5D, the transfer mechanism 52 includes a motion constraining member 53. The motion constraining member 53 includes a plurality of grippers 53a configured to hold a front edge portion of the processed plate material W2 and gripper support bodies 53b to which the grippers 53a are fitted. Each of the gripper support bodies 53b is fitted to a lower end of a swing arm 55, pivotal about a leftwardly and rightwardly extending pivot pin 55a, and is configured to be driven up and down via a lifting cylinder 58. When the swing arm 55 is pivoted by a swing cylinder 56, the motion constraining member 53 in its entirety is capable of being swung forwardly and rearwardly. It is to be noted that the swing cylinder 56 is pivotable about a leftwardly and rightwardly extending pivot pin 56a. A support member 57 supporting the corresponding swing arm 55 is secured to the frame 17.

Figure 5A:
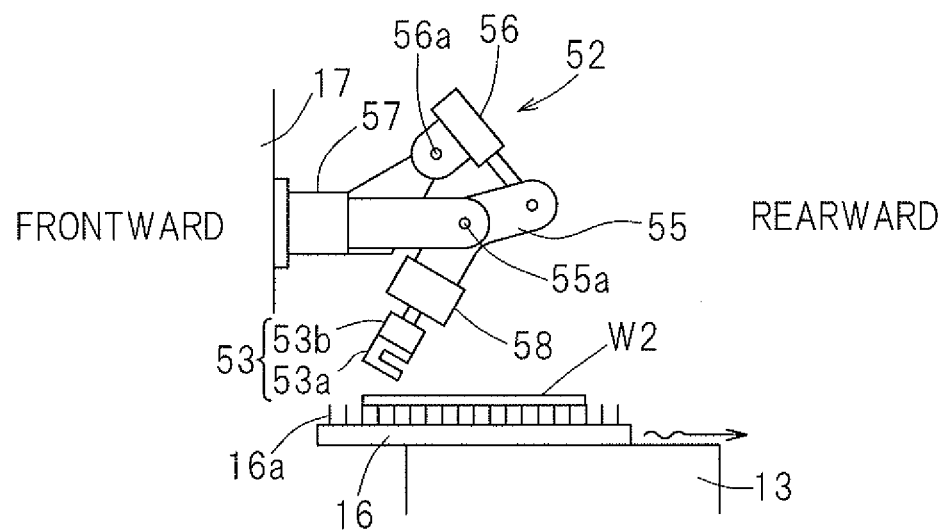
FIGS. 5A-5D are explanatory diagrams showing the sequence of a transfer mechanism of the plate material conveyance apparatus.
Figure 5B:
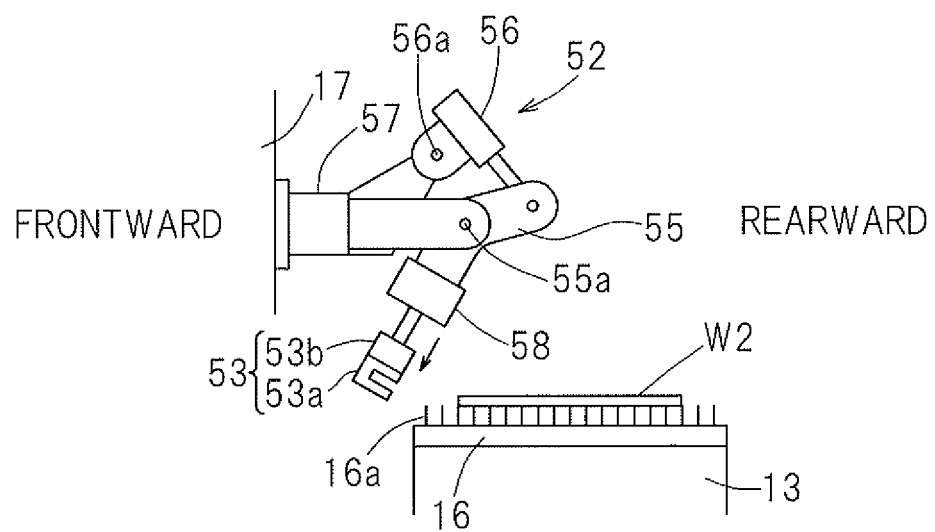
Figure 5C:
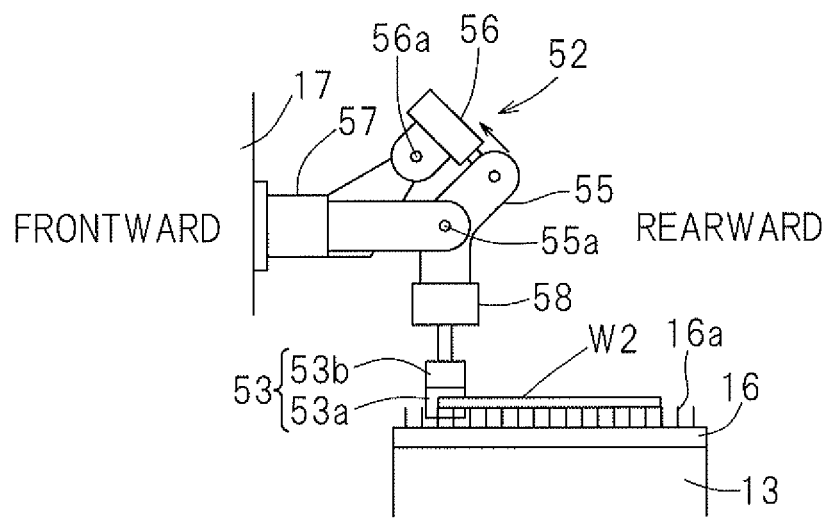

The transfer mechanism 52 is operable to transfer the processed plate material W2 from the temporary placement table 16 onto the processed plate material placement unit 13 through the following sequence of operation. Namely, in a condition in which the motion constraining member 53 has been ascended and swung forwardly as shown in FIG. 5A, the temporary placement table 16 having the processed plate material W2 mounted thereon is slid rearwardly to the upper position of the processed plate material placement unit 13. When the temporary placement table 16 arrives at the upper position of the processed plate material placement unit 13, the motion constraining member 53 descends as shown in FIG. 5B. Subsequently, as shown in FIG. 5C, the motion constraining member 53 swings rearwardly to allow the grippers 53a to hold the front edge portion of the processed plate material W2.

Figure 5D:
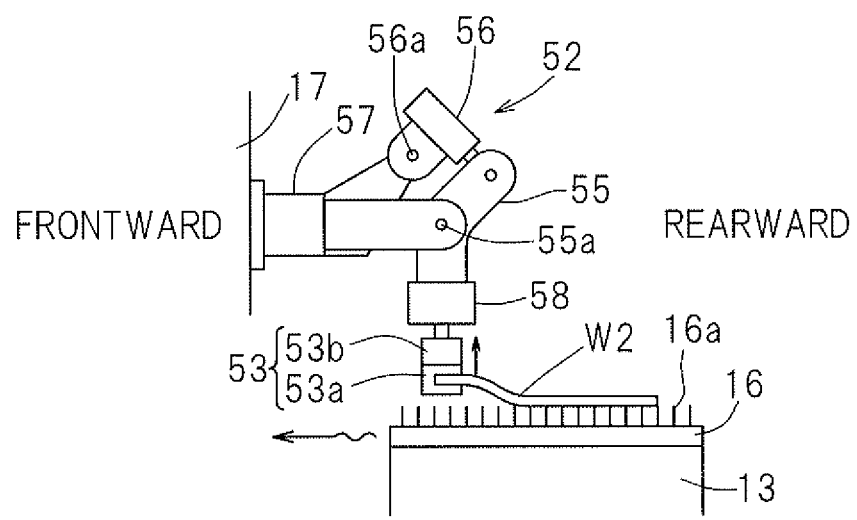

Thereafter, the motion constraining member 53 ascends as shown in FIG. 5D to allow the front edge portion of the processed plate material W2 to be lifted slightly. While in this condition, the temporary placement table 16 slides forwardly. Since the processed plate material W2 is constrained from undergoing a movement in a forwardly direction with the front edge portion thereof gripped by the grippers 53a, it remains resting at the upper position of the processed plate material placement unit 13. With the front edge portion of the processed plate material W2 slightly lifted, the grippers 53a do not contact the brushes 16a of the temporary placement table 16 and, the resistance between the temporary placement table 16 and the processed plate material W2 is low. Therefore, the temporary placement table 16 can be slid with no difficulty. When the temporary placement table 16 leaves from the upper position of the processed plate material placement unit 13, the grippers 53a of the motion constraining member 53 release the processed plate material W2 and the motion constraining member 53 then returns from a rearward swung position to a forward swung position. As a result, the processed plate material W2 is placed on the processed plate material placement unit 13.

Figure 9A:
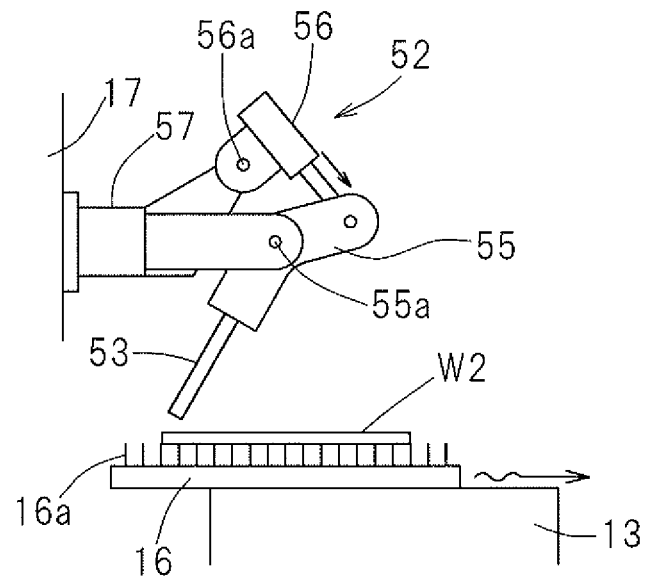
FIGS. 9A and 9B are explanatory diagrams showing the sequence of a different transfer mechanism of the plate material conveyance apparatus.
Figure 9B:
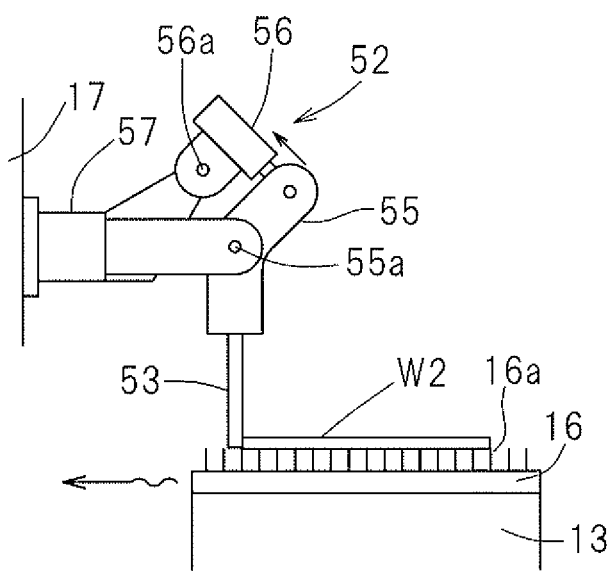

The transfer mechanism 52 discussed above merely serves to constrain the processed plate material W2 from moving in a direction towards the unprocessed plate material placement unit 12, that is, in the forward direction via the motion constraining member 53 and, hence, the motion constraining member 53 does not perform any complicated operation. For this reason, the transfer mechanism 52 is simply constructed. By way of example, as shown in FIG. 9, the motion constraining member 53 may be designed and configured so that it will not hold the front edge portion of the processed plate material W2, but it may constrain the forward movement of the processed plate material W2 by blocking the path of movement of the processed plate material W2. In this example, the motion constraining member 53 is in the form of a plate having no gripper and no lifting cylinder for ascending or descending the motion constraining member 53 is used. By so doing, the transfer mechanism 52 is even more simply constructed.

Various operating portions of the plate processing system according to the present preferred embodiment are controlled by a control device (not shown) to perform a series of predetermined operations. One example of such operation will be described with particular reference to FIGS. 6 to 8 showing the flow of the series of those operations. It is, however, to be noted that the plate processing system shown in FIGS. 6A to 8C is shown as simplified.

FIG. 6A illustrates a condition prior to the start of the processing. At this time, the loader 14 is positioned above the unprocessed plate material placement unit 12 and, on the other hand, the unloader 15 is held in a standby condition at a position above the plate material guide table 5. The temporary placement table 16 (as shown in FIG. 7B) is held at the upper position of the processed plate material placement unit 13 and does not exist at the upper position of the unprocessed plate material placement unit 12, and, therefore, it is not shown in FIG. 6A.

Starting from the above described condition shown in FIG. 6A, the plate material holding body 34 of the loader 14 picks up the uppermost one of the stack of the unprocessed plate materials W1 on the unprocessed plate material placement unit 12 (as shown in FIG. 6B). The pick-up of the uppermost unprocessed plate material W1 takes place through a process of descending of the plate material holding body 34, separation from the unprocessed plate material W1 on a lower side of the uppermost unprocessed plate material W1 by the previously described separating operation, suction of the uppermost unprocessed plate material W1 with the use of the suction pads 35 (best shown in FIG. 1) and ascending of the plate material holding body 34.

The loader 14 having picked up the unprocessed plate material W1 moves in the leftward direction to the upper position of the processing table 2 (as shown in FIG. 6C), and subsequently places the unprocessed plate material W1 on the processing table 2 (as shown in FIG. 6D). The placement of the unprocessed plate material W1 takes place through a process of descending of the plate material holding body 34, release of the unprocessed plate material W1 and ascending of the plate material holding body 34. The plate processing machine 1 performs the processing on the unprocessed plate material W1 which has been delivered in the manner described above.

While the plate processing machine 1 undergoes the processing, the loader 14 moves in the rightward direction to return to the upper position of the unprocessed plate material placement unit 12 (as shown in FIG. 6E), and picks up the next adjacent unprocessed plate material W1 following the uppermost unprocessed plate material through a similar operation as described above. The loader 14, upon completion of the pick-up of the next adjacent unprocessed plate material W1, is held in a standby condition at the upper position of the unprocessed plate material unit 12 (as shown in FIG. 7A) with the plate material holding body 34 ascended. Upon completion of the pick-up operation performed by the loader 14 to pick up the unprocessed plate material W1, the temporary placement table 16 is slid forward from the upper position of the processed plate material placement unit 13 towards the upper position of the unprocessed plate material placement unit 12 (as shown in FIG. 7B).

After termination of the processing performed by the plate processing machine 1, the unloader 15 then held at the standby position moves leftwards to a portion above the processing table 2 (as shown in FIG. 7C). Subsequently, the unloader 15 is held in position to allow the grippers 43 to hold the processed plate material W2 on the processing table 2, pulls it to a position above the temporary placement table 16 then held at the upper position of the unprocessed plate material placement unit 12, and finally transports rightwards (as shown in FIG. 7D).

Figure 8A:
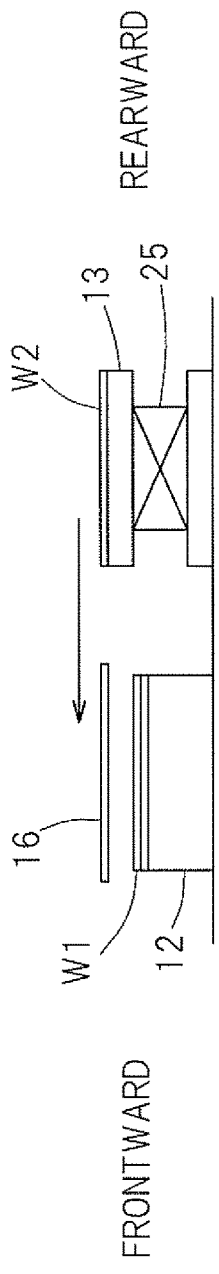
FIGS. 8A-8C are explanatory diagrams showing a third portion of the operation of the plate processing system.

The temporary placement table 16 having the processed plate material W2 mounted thereon is slid rearwardly to the upper position of the processed plate material placement unit 13 (as shown in FIG. 7E), and transfers the processed plate material W2 onto the processed plate material placement unit 13 (as shown in FIG. 8A) in cooperation with the transfer mechanism 52 in the manner described previously. At this time, the height of the processed plate material placement unit 13 has been adjusted by the lifting device 25. The temporary placement table 16 moves forwards to return to the upper position of the unprocessed plate material placement unit 12.

Figure 8B:
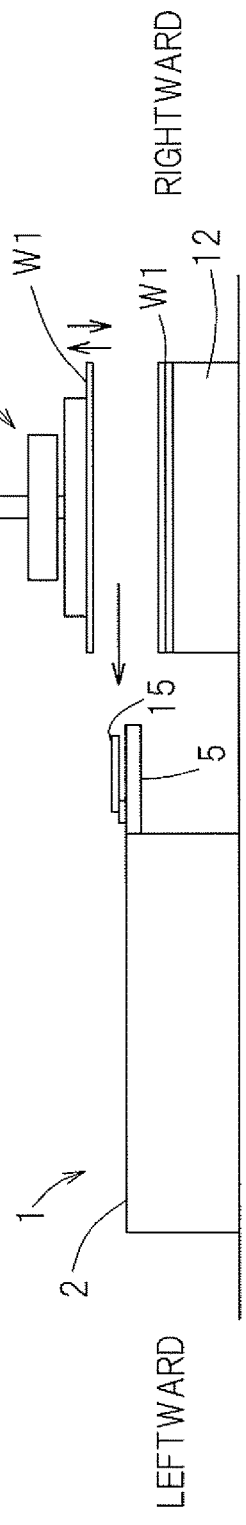
Figure 8C:
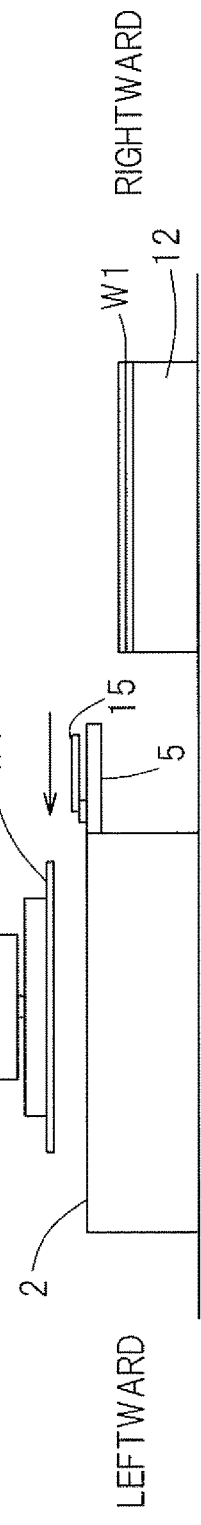

While the temporary placement table 16 undergoes a reciprocal movement between the upper position of the unprocessed plate material placement unit 12 and the processed plate material placement unit 13, the unloader 15 moves leftwards from the upper position of the unprocessed plate material placement unit 12 to return to the standby position (as shown in FIG. 8B), and the loader 14 starts the delivery of the unprocessed plate material W1 onto the plate processing machine 1 (as shown in FIG. 8C). Thereafter, with the loader 14, the unloader 15 and the temporary placement table 16 repeating similar operations to those described above, the unprocessed plate materials W1 on the unprocessed plate material placement unit 12 are delivered one by one onto the plate processing machine 1, and the processed plate materials W2, which have been successively processed by the plate processing machine 1, are transported successively to the processed plate material placement unit 13.

As hereinabove described, during a period in which the plate processing machine 1 undergoes the processing, the loader 14 is configured to perform a loading preparation to deliver the unprocessed plate material W1 and, on the other hand, the unloader 15 is configured to perform an unloading preparation to transfer the processed plate material W2. Therefore, the wait time of the plate processing machine 1 during the loading and unloading of the plate materials W (W1, W2) is significantly reduced or minimized. In particular, the loading of the unprocessed plate material W1 by the loader 14 requires an operation to separate only the uppermost unprocessed plate material W1 to perform, and therefore, takes a substantial length of time. Accordingly, effects of the loading preparation performed by the loader 14 during the period in which the plate processing machine 1 performs the processing are substantial. Also, the region of travel of the loader 14 and that of the unloader 15 are different from each other and, therefore, the operation of the loader 14 and the operation of the unloader 15 in no way interfere with each other. As a result, the wait time of each of the loader 14 and the unloader 15 is significantly reduced or minimized. In view of the foregoing, the cycle time of plate material loading and unloading relative to the plate processing machine 1 is significantly reduced or minimized.

The plate material conveyance apparatus 11 according to the present preferred embodiment is designed and configured so that the processed plate material W2 received from the unloader 15 at the upper position of the unprocessed plate material placement unit 12 is transferred by the temporary placement table 16 to the processed plate material placement unit 13. Since the temporary placement table 16 is used for the single processed plate material W2 to be placed thereon, it is lightweight as compared with, for example, a carriage on which a number of processed plate materials W2 are placed in the stacked fashion. For this reason, a quick slide is accomplished between the unprocessed plate material placement unit 12 and the processed plate material placement unit 13 and, correspondingly, the cycle time of the plate material loading and unloading is significantly reduced or minimized. Also, the drive source required to slide the temporary placement table 16 is compact in size and the electric power consumption is significantly reduced or minimized. Since the transfer of the processed plate material W2 by the temporary placement table 16 takes place prior to the stacking on the processed plate material placement unit 13, there is no problem even though the processed plate material W2 is displaced from a position on the temporary placement table 16.

In addition, in the case of the structure in which, without utilizing the temporary placement table 16, the processed plate material W2 is directly loaded on a carriage (not shown) by the unloader 15, the processed plate material W2 on the carriage and the processed plate material W2 placed thereon by the unloader 15 will be in friction with each other and, therefore, there is concern that both of the processed plate materials W2 may get scratched. However, the structure according to the present preferred embodiment is free from such problem and inconvenience.

Since the region of travel of the loader 14 and the region of travel of the unloader 15 in the plate material conveyance apparatus 11 are disposed one above the other relative to each other, there is no need to secure a large space for installation of each of the loader 14 and the unloader 15. Also, a first portion of the processing table 2, where the unprocessed plate material W1 is mounted, and a second portion where the processed plate material W2 is unloaded are commonized. Therefore, the forward and rearward dimension of the processing table 2, that is, the dimension in a horizontal direction perpendicular or substantially perpendicular to the direction of conveyance (leftward and rightward direction) of the loader 14 and the unloader 15 is significantly reduced or minimized.

In the case of the above described preferred embodiment, the processed plate material placement unit 13 is disposed rearwardly of the unprocessed plate material placement unit 12 and laterally (rightwardly) of the processing head 3 of the plate processing machine 1. In other words, the processing head 3 is disposed rearwardly of a direction perpendicular or substantially perpendicular to the direction of plate material conveyance (leftward and rightward direction) relative to the processing table 2, the processed plate material placement unit 13 is disposed rearwardly of the unprocessed plate material placement unit 12, and the processing head 3 and the processed plate material placement unit 13 are disposed juxtaposed relative to each other in the plate material conveyance direction (leftward and rightward direction). The arrangement discussed above makes it possible to snugly and neatly accommodate the plate processing machine 1 and the plate material conveyance apparatus 11 within a rectangular or substantially rectangular space. It is to be noted that the position of the processed plate material placement unit 13 may, however, not be necessarily limited to that described hereinbefore, but it may be forwardly or laterally of the unprocessed plate material placement unit 12.

Although the present invention has been fully described in connection with the preferred embodiments thereof with reference to the accompanying drawings which are used only for the purpose of illustration, numerous changes and modifications to preferred embodiments described above are possible and within the scope of the present invention. Accordingly, such changes and modifications are, unless they depart from the scope of the present invention as determined by the claims, to be construed as included therein.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A plate material conveyance apparatus disposed next to a plate processing machine, the plate material conveyance apparatus comprising:
   an unprocessed plate material placement table;
   a processed plate material placement table disposed at a position different from that of the unprocessed plate material placement table;
   a temporary placement table slidable between the unprocessed plate material placement table and the processed plate material placement table and configured to include a position switching capability to switch to an upper position of each of the unprocessed plate material placement table and the processed plate material placement table;
   a loader reciprocally movable between the unprocessed plate material placement table and the plate processing machine and operable to place an unprocessed plate material onto the plate processing machine; and
   an unloader reciprocally movable between the unprocessed plate material placement table and the plate processing machine at a location below a region of travel of the loader and in parallel or substantially in parallel to the loader, the unloader being operable to unload a processed plate material from the plate processing machine onto the temporary placement table then assuming a position above the unprocessed plate material placement table; wherein
   the temporary placement table transfers the processed plate material, which has been received from the unloader at an upper position of the unprocessed plate material placement table, onto the processed plate material placement table;
   the unloader moves to a standby position between the unprocessed plate material placement table and the plate processing machine and stays in the standby position as the loader moves from the unprocessed plate material placement table to the plate processing machine and places the unprocessed plate material onto the plate processing machine;
   the loader moves from the plate processing machine to the unprocessed plate material placement table, picks up the unprocessed plate material from the unprocessed plate material placement table, and stays above the unprocessed plate material placement table as the plate processing machine is processing the unprocessed plate material; and
   the unloader moves from the standby position to the plate processing machine, holds the processed plate material, and moves from the plate processing machine to the unprocessed plate material placement table to unload the processed plate material onto the temporary placement table.

2. The plate material conveyance apparatus according to claim 1, further comprising a motion constraining member configured to constrain the processed plate material, which has been transported to the processed plate material placement table while having been mounted on the temporary placement table, from moving in a direction where the unprocessed plate material placement table exists; wherein
   as the temporary placement table returns to the unprocessed plate material placement table in a state in which the movement of the processed plate material is constrained by the motion constraining member, the processed plate material is permitted to be mounted on the processed plate material placement table.

3. A plate processing system comprising:
   a plate processing machine; and
   the plate material conveyance apparatus including:
   an unprocessed plate material placement table;
   a processed plate material placement table disposed at a position different from that of the unprocessed plate material placement table;
   a temporary placement table slidable between the unprocessed plate material placement table and the processed plate material placement table and configured to include a position switching capability to switch to an upper position of each of the unprocessed plate material placement table and the processed plate material placement table;
   a loader reciprocally movable between the unprocessed plate material placement table and the plate processing machine and operable to place an unprocessed plate material onto the plate processing machine; and
   an unloader reciprocally movable between the unprocessed plate material placement table and the plate processing machine at a location below a region of travel of the loader and in parallel or substantially in parallel to the loader, the unloader being operable to unload a processed plate material from the plate processing machine onto the temporary placement table then assuming a position above the unprocessed plate material placement table; wherein
   the plate material conveyance apparatus is disposed next to the plate processing machine;
   the temporary placement table transfers the processed plate material, which has been received from the unloader at an upper position of the unprocessed plate material placement table, onto the processed plate material placement table;
   the unloader moves to a standby position between the unprocessed plate material placement table and the plate processing machine and stays in the standby position as the loader moves from the unprocessed plate material placement table to the plate processing machine and places the unprocessed plate material onto the plate processing machine;
   the loader moves from the plate processing machine to the unprocessed plate material placement table, picks up the unprocessed plate material from the unprocessed plate material placement table, and stays above the unprocessed plate material placement table as the plate processing machine is processing the unprocessed plate material; and
   the unloader moves from the standby position to the plate processing machine, holds the processed plate material, and moves from the plate processing machine to the unprocessed plate material placement table to unload the processed plate material onto the temporary placement table.

4. The plate processing system according to claim 3, wherein
   the plate processing machine includes:
   a processing table configured to have a plate material to be processed placed thereon; and a processing head disposed rearwardly of the processing table;

the processing table includes a first portion, where the unprocessed plate material delivered by the loader is placed, and a second portion from which the processed plate material is unloaded by the unloader.

5. The plate processing system according to claim 4, wherein the processed plate material placement table is disposed rearwardly of the unprocessed plate material placement table and laterally of the processing head of the plate processing machine.

* * * * *

UNITED STATES PATENT AND TRADEMARK OFFICE
CERTIFICATE OF CORRECTION

PATENT NO. : 9,682,414 B2  Page 1 of 1
APPLICATION NO. : 14/390827
DATED : June 20, 2017
INVENTOR(S) : Hirokazu Ichioka It is certified that error appears in the above-identified patent and that said Letters Patent is hereby corrected as shown below:

On the Title Page

The Assignee in item (73) should read as follows:
"MURATA MACHINERY, LTD. Kyoto (JP)"

Signed and Sealed this
Ninth Day of January, 2018

Joseph Matal
*Performing the Functions and Duties of the*
*Under Secretary of Commerce for Intellectual Property and*
*Director of the United States Patent and Trademark Office*